(12) United States Patent
Aizono et al.

(10) Patent No.: US 8,503,017 B2
(45) Date of Patent: Aug. 6, 2013

(54) IMAGE FORMING APPARATUS, CONTROL METHOD FOR THE SAME, AND STORAGE MEDIUM

(75) Inventors: Keisuke Aizono, Kawasaki (JP); Hiroyasu Ide, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 321 days.

(21) Appl. No.: 12/875,397

(22) Filed: Sep. 3, 2010

(65) Prior Publication Data

US 2011/0058210 A1 Mar. 10, 2011

(30) Foreign Application Priority Data

Sep. 10, 2009 (JP) .................................. 2009-209813

(51) Int. Cl.
*G06F 15/00* (2006.01)
(52) U.S. Cl.
USPC ........................................................ 358/1.15

(58) Field of Classification Search
USPC ................................................ 358/1.14, 1.15
See application file for complete search history.

(56) References Cited

U.S. PATENT DOCUMENTS

2006/0274353 A1* 12/2006 Nemoto ...................... 358/1.14

FOREIGN PATENT DOCUMENTS

| JP | 11-258954 A | 9/1999 |
| JP | 2007-065211 A | 3/2007 |
| JP | 2008-209813 A | 9/2008 |

* cited by examiner

*Primary Examiner* — Saeid Ebrahimi Dehkordy
(74) *Attorney, Agent, or Firm* — Canon U.S.A., Inc. IP Division

(57) ABSTRACT

When attribute information for a user has been acquired by authentication using an authentication apparatus, a restriction on a useable function is imposed according to the attribute information. When a fee has been collected by a fee collection apparatus, a restriction is imposed on preset functions. In either of these cases, use of the image forming apparatus by another user is prohibited until use by the first user in the useable state is finished.

18 Claims, 11 Drawing Sheets

FIG.3

| JOB | CARD AUTHENTICATION USER | | COIN VENDOR USER |
|---|---|---|---|
| | USER A (MANAGERIAL STAFF) | USER B (GENERAL OFFICE EMPLOYEE) | |
| MONOCHROME COPY | ○ | ○ | ○ (FEE: 10 YEN/SHEET) |
| COLOR COPY | ○ | × | ○ (FEE: 40 YEN/SHEET) |
| PRINT | ○ | ○ | × |
| SEND/FAX | ○ | ○ | × |
| BOX | ○ | ○ | × |

| JOB | CARD AUTHENTICATION USER | | | COIN VENDOR USER |
| --- | --- | --- | --- | --- |
| | USER A (MANAGERIAL STAFF) | USER B (GENERAL OFFICE EMPLOYEE) | USER C (GENERAL OFFICE EMPLOYEE) | |
| MONOCHROME COPY | ○ | ○ | ○ (ADDITIONAL FEE: 10 YEN/ SHEET) | ○ (FEE: 10 YEN/ SHEET) |
| COLOR COPY | ○ | ○ (ADDITIONAL FEE: 10 YEN/ SHEET) | ○ (ADDITIONAL FEE: 30 YEN/ SHEET) | ○ (FEE: 40 YEN/ SHEET) |
| PRINT | ○ | ○ | ○ | × |
| SEND/FAX | ○ | ○ | ○ | × |
| BOX | ○ | ○ | ○ | × |

601　602　603　604

600

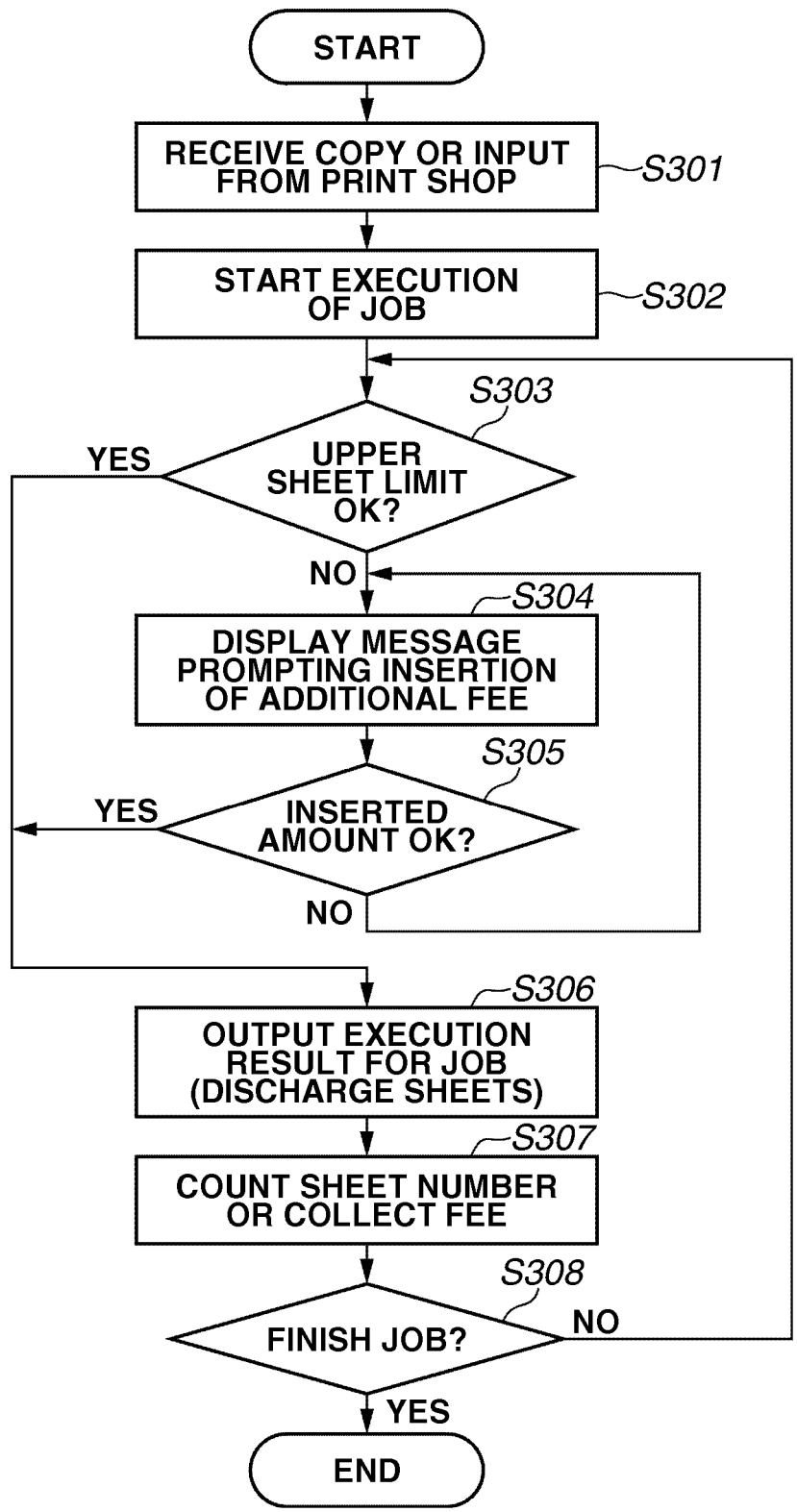

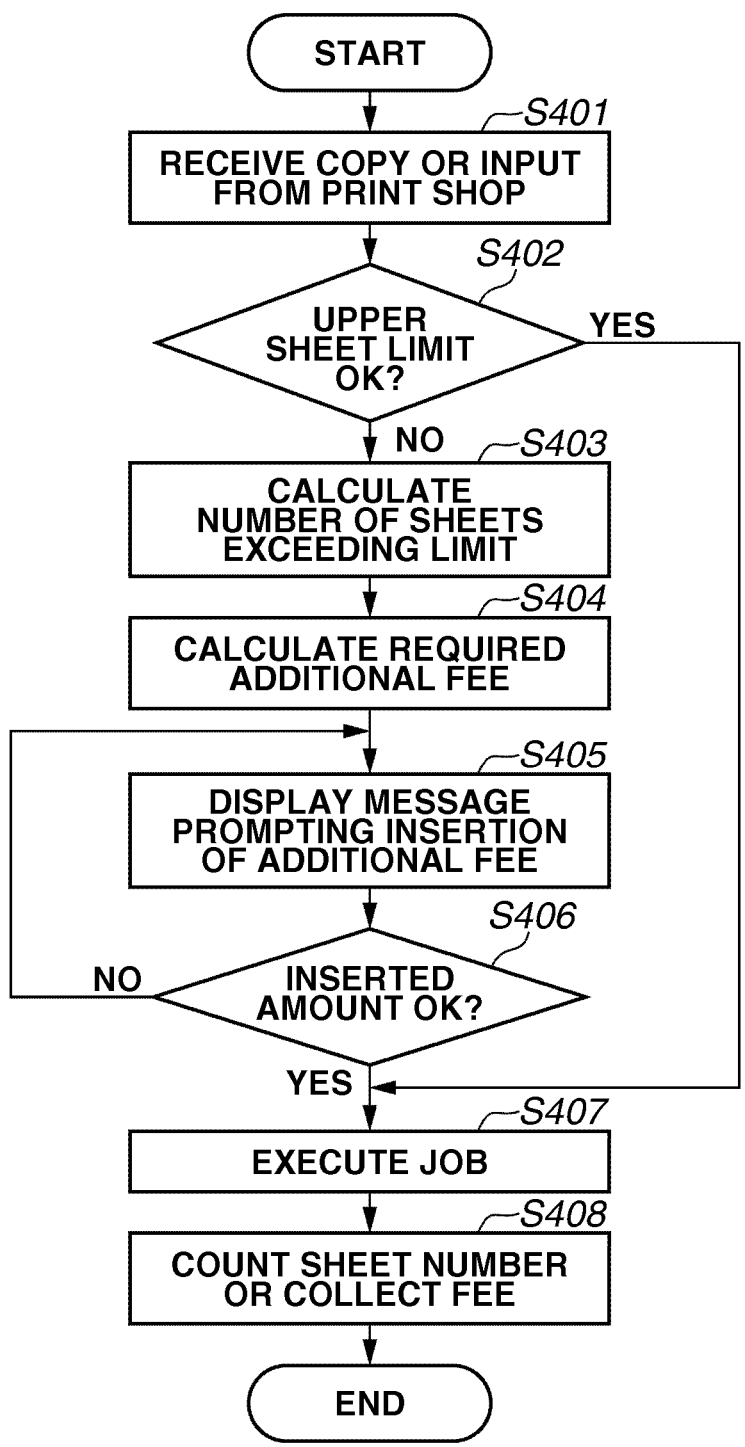

IMAGE FORMING APPARATUS, CONTROL METHOD FOR THE SAME, AND STORAGE MEDIUM

BACKGROUND OF THE INVENTION

1. Field of the Invention

The present invention relates to an image forming apparatus, a control method for the same and a storage medium.

2. Description of the Related Art

Recently, there has been a demand for improving the security features of information processing apparatuses to prevent leakage of information. A known image forming apparatus such as a multifunction peripheral (MFP) that handles document information as electrical data includes various types of security functions and controls access by user authentication or the like. For example, a sequence for user access control includes imposing a restriction on the use by a user of the respective functions of an image forming apparatus and only executing image formation (printing) of authenticated user data.

For example, Japanese Patent Application Laid-Open No. 11-258954 proposes a switchable image forming apparatus that includes a fee insertion device, and has a charging management mode (general user mode) and a non-charging management mode (for managers and servicing personnel). In this image forming apparatus, a suitable restriction is imposed on the functions that can be used by a general user or by a manager by providing a setting for image forming conditions that differ according to the mode.

Furthermore, an image forming apparatus has been recently developed in which a charging apparatus such as a coin vendor and an authentication apparatus such as a card reader are connected to enable a common-use environment by both a general non-specified user and a specified user such as an employee. Japanese Patent Application Laid-Open No. 2007-65211 proposes a technique of suitably selecting a charging management apparatus that charges for the execution of a job in an image forming apparatus connected to a plurality charging management apparatuses such as a coin vendor or a card reader.

However, the following problems arise when user access is controlled in an image forming apparatus in which both a coin vendor and a card reader are connected in the above manner. For example, when permission to use the apparatus is given to another user who has inserted a fee into the coin vendor after a specified user has logged into the image forming apparatus using card authentication via a card reader, the access control may no longer match the situation. More specifically, when a plurality of users are logged in, who have different user restrictions imposed on different functions, it is possible that a restriction must be imposed on use by another user in relation to functions that a specified user is permitted to use. In that case, there is the problem that it is difficult to suitably restrict use of respective functions to respective users.

SUMMARY OF THE INVENTION

An image forming apparatus includes a switching unit configured to switch to a useable state in an authentication mode in which use of the image forming apparatus is permitted according to an authentication result when authentication is performed using the authentication apparatus, and configured to switch to a useable state in a fee collection mode in which use of the image forming apparatus is permitted according to a collected fee when a fee is collected using the fee collection apparatus, a restriction unit configured to impose a restriction on a useable function according to attribute information for an authenticated user when switching to the authentication mode, and configured to impose a restriction on a preset function in the fee collection mode when switching to the fee collection mode, and a prohibition unit configured to prohibit use by another user when a restriction is imposed on the function.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example of a management table including use permission information for each function in the MFP according to the first exemplary embodiment of the present invention.

FIG. 6 illustrates an example of a management table including use permission information for each function in the MFP according to a second exemplary embodiment of the present invention.

FIG. 10 illustrates a flowchart of a job execution procedure when an additional fee is required during execution of a job in the MFP according to the third exemplary embodiment of the present invention.

FIG. 11 illustrates a flowchart of a job execution procedure when an additional fee is required when commencing a job in the MFP according to the third exemplary embodiment of the present invention.

DESCRIPTION OF THE EMBODIMENTS

Various exemplary embodiments, features, and aspects of the invention will be described in detail below with reference to the drawings.

An exemplary embodiment of the present invention will be described below. The exemplary embodiment described below is adapted to facilitate comprehension of various concepts of the present invention including a generic concept, an intermediate concept and a specific concept. Furthermore the technical scope of the present invention is determined by the scope of the patent claims, and is not restricted by the following exemplary embodiments.

A first exemplary embodiment of the present invention will be described bellow referring to FIG. 1 to FIG. 5. An MFP will be described as an example of an image forming apparatus in the present embodiment.

Configuration of Image Forming Apparatus

Figure 1:
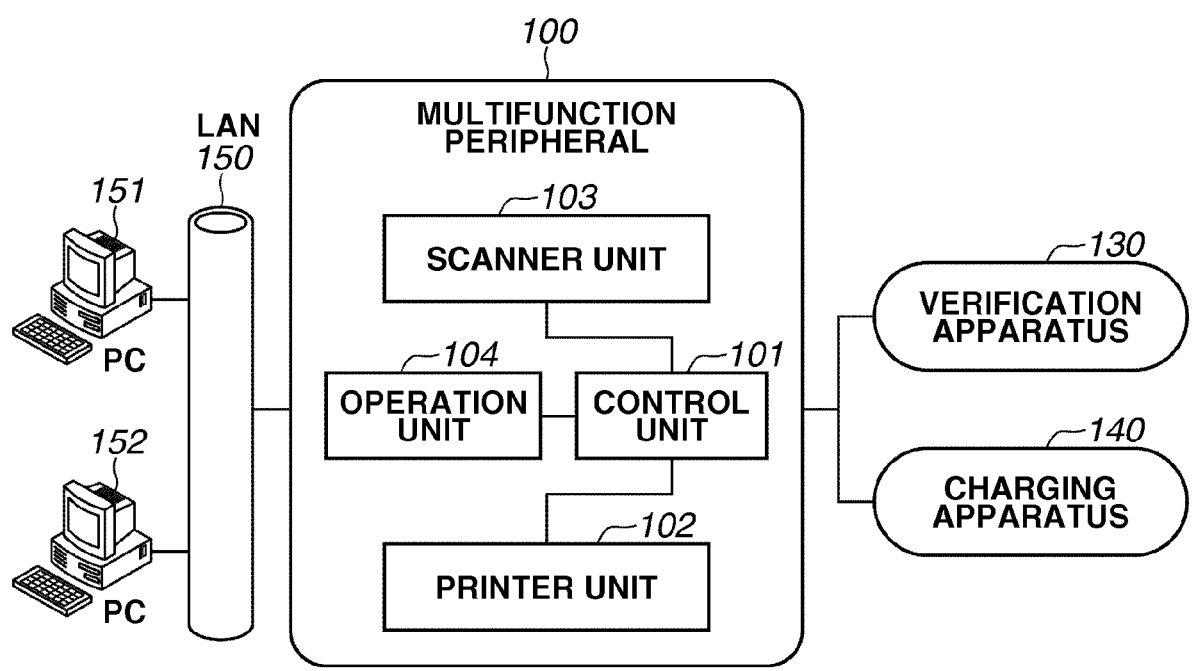
FIG. 1 illustrates an example of a system configuration of an MFP according to a first exemplary embodiment of the present invention.

Firstly, an example of a system configuration of an MFP 100 will be described using FIG. 1. As illustrated in FIG. 1, an MFP 100 includes a printer unit 102, a scanner unit 103, an operation unit 104, and a control unit 101, and is connected with an authentication apparatus 130 and a charging apparatus 140. The MFP 100 is connected with a host computer (PC) 151, 152 through a local area network (LAN) 150. Any number of PCs 151, 152 may be connected to the LAN 150.

The control unit 101 realizes various functions in the MFP 100 by controlling the operation of the printer unit 102, the scanner unit 103, and the operation unit 104. The printer unit 102 forms images (prints) on a recording medium (paper) using image data received from the control unit 101. The scanner unit 103 generates image data (scan image data) by reading an image from an original document. The operation unit 104 includes a keyboard and an LCD display unit. The state of various operation screens, instruction screens and the MFP 100 is displayed on the LCD display unit of the operation unit 104.

The authentication apparatus 130 is an apparatus for authenticating a user who uses the MFP 100. The present exemplary embodiment describes a non-contact IC card reader as an example of the authentication apparatus 130. Attribute information of a user is prerecorded on the non-contact IC card (hereafter referred to as "IC card") used in the authentication process. The attribute information of a user read from the IC card in the authentication apparatus 130 is sent to the control unit 101 to be used in the authentication process.

The charging apparatus 140 is a fee collection apparatus for collecting a fee charged to a user that uses the MFP 100. In the present exemplary embodiment, the charging apparatus 140 is a coin vendor that receives a cash payment (bills or coins) from a user. The charging apparatus 140 may be a fee collection apparatus or the like that collects a fee using a cash card, a prepaid card, electronic money, or the like. When the MFP 100 is operated by a fee collected using the coin vendor 140, the fee is calculated by the control unit 101 and charged to the user according to a number of print copies, a size, a color mode or the like of the job input by the user. The calculated fee is collected from the user by the coin vendor 140.

Configuration of the Control Unit 101

Figure 2:
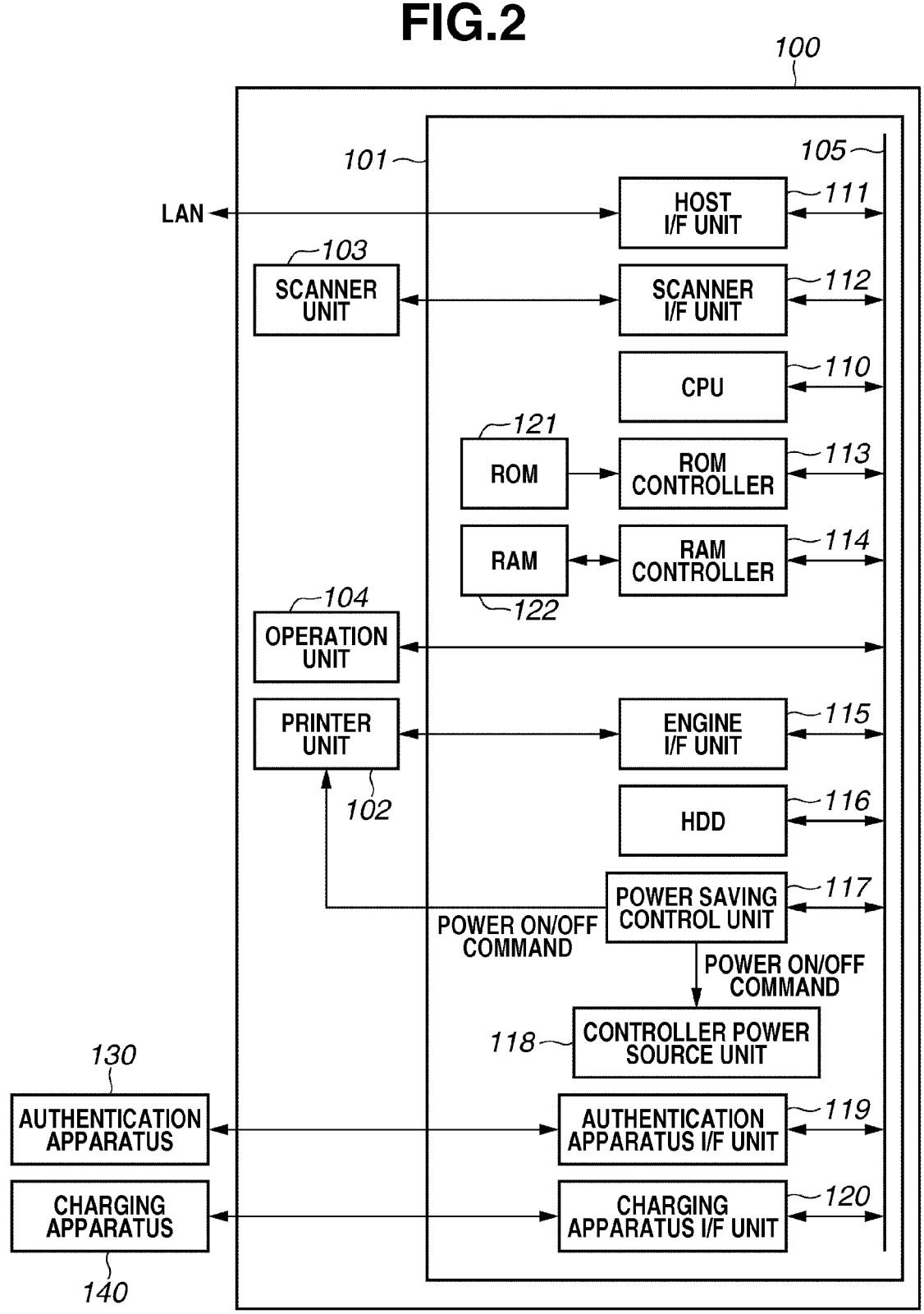
FIG. 2 illustrates an example of a configuration of a control unit in the MFP according to the first exemplary embodiment of the present invention.

An example of a configuration of the control unit 101 will be described below using FIG. 2. Each device in the control unit 101 is connected to a central processing unit (CPU) 110 through an internal bus 105. The CPU 110 reads programs stored in a read only memory (ROM) 121 using a ROM controller 113, and controls the overall operation of the control unit 101 with the programs. The ROM 121 is a rewritable ROM (Flash ROM). A random access memory (RAM) 122 is used as a work memory when the CPU 110 executes various processes, or as a buffer that stores image data. Access from the CPU 110 to the RAM 122 is performed via a RAM controller 114.

A host I/F unit 111 sends and receives image data or print code data stated in printer-specific language by communication with the PC 151 and 152 that are connected via the LAN 150. A scanner I/F unit 112 communicates with the scanner unit 103 and receives scanner image data input from the scanner unit 103. An engine I/F unit 115 communicates with the printer unit 102 and outputs image data for printing to the printer unit 102. A HDD 116 temporarily stores image data for printing or a FAX transmission, and stores the store target image data using a BOX function or the like.

The authentication apparatus 130 is connected to an authentication apparatus I/F unit 119. The CPU 110 controls the authentication apparatus 130 via the authentication apparatus I/F unit 119, and performs user authentication based on information received from the authentication apparatus 130. The CPU 110 permits use of a function of the MFP 100 to a user based on the authentication result. The charging apparatus (coin vendor) 140 is connected to a charging apparatus I/F unit 120. The CPU 110 controls the charging apparatus 140 via the charging apparatus I/F unit 120, and collects a fee charged to the user with the charging apparatus 140.

A power saving control unit 117 switches the MFP 110 to power saving mode by placing the power source of the printer unit 102 and a controller power source unit 118 in the OFF position when a predetermined time is exceeded without an operation performed on the operation unit 104. The host unit I/F unit 111 is under the supply of an electrical current also during power saving mode, and monitors receipt of data from an external unit. When the host I/F unit 111 detects receipt of data from an external unit, the power saving control unit 117 returns the MFP 100 to normal operating mode by returning the power source for the printer unit 102 and the control power source unit 118 to the ON position.

The MFP 100 having the above configuration realizes various functions by the CPU 110 in the control unit 101. The MFP 110 executes a print job in the following manner. Firstly, a setting and data related to the print job is received via the host I/F unit 11 through the LAN 150 from the external PC 151 or PC 152. The control unit 101 develops the data for the job that is stated in page description language (PDL) into a bit map format, and generates image data as the print object according to designated information. The control unit 101 sends the generated image data to the printer unit 102 via the engine I/F unit 115 and starts print processing.

A copy job (color or monochrome) is realized in the MFP 100 in the following manner. A user inputs a setting and execution instruction for a copy job via the operation unit 104. The control unit 101 starts execution of the copy job according to set information such as the input paper size information or color mode information. Firstly, image data is produced by reading an image from the original document in the scanner unit 103 according to the control of the control unit 101. The CPU 110 controls the control unit 101 to acquire the produced image data via the scanner I/F unit 112 and execute image processing using the image data according to the set information. The CPU 110 sends the image data via the engine I/F unit 115 to the printer unit 102 and starts print processing.

Access Control in the Image Forming Apparatus

In the present exemplary embodiment, respective users start use of the MFP 100 by authentication via the authentication apparatus 130 using an IC card that records the attribute data of that user, or by inserting a fee into the coin vendor 140. When the use of the MFP is started by card authentication using an IC card, the MFP 100 restricts the useable functions according to the attribute information acquired in the authentication process to thereby realize user access control. When the use of the MFP is started by insertion of a fee into the coin vendor 140, the MFP 100 realizes access control by permitting use of predetermined functions to the user. In either of the above cases, the MFP 100 prohibits its use by another user when the MFP 100 switches to a useable state (log-in state).

Access control using the authentication apparatus 130 and the coin vendor 140 in the MFP 100 according to the present exemplary embodiment will be described below using FIG. 5. Firstly, when the MFP 100 is in a state in which no user is logged in, (a log-off state), in step S101, the CPU 110 determines whether the use has been started by a user. The use of the MFP 100 is started by card authentication using the authentication apparatus 130 or by insertion of a fee into the coin vendor 140. When using card authentication, the IC card of each respective user is used to enable reading by the authentication apparatus 130 of information (attribute information or the like) that is prerecorded on the card. When the CPU 110 determines that either card authentication or insertion of a fee into the coin vendor 140 has been performed, the processing proceeds to step S102. On the other hand, when the CPU 110 determines that neither card authentication nor insertion of a fee into the coin vendor 140 has been performed, the determination process is repeated. In step S101, a screen including a message prompting IC card authentication or fee insertion may be displayed on the LCD display unit of the operation unit 104. In this manner, the user convenience can be improved.

In step S102, the CPU 110 determines whether the operation performed in step S101 was card authentication using the authentication apparatus 130. When it is determined that the operation was card authentication, the processing proceeds to step S103. On the other hand, when the operation is determined to be insertion of a fee into the coin vendor 140 and not card authentication, the processing proceeds to step S105. After both steps S103 and S105, the CPU 110 places the MFP 100 in a useable state.

Switching to Authentication Mode

In step S103, the CPI 110 switches the MFP 100 to a useable mode (log-in state) in which use of the MFP 100 is permitted to a user according to an authentication mode based on the authentication result of the card authentication. In step S104, the CPU 110 restricts the useable functions according to the user attribute information acquired from the card authentication. More specifically, the CPU 110 refers to the management table 300 illustrated in FIG. 3 that is pre-stored in the rewritable ROM 121 and reads out the use permission information for each function assigned to the acquired attribute information. Furthermore a restriction is imposed on the functions according to the use permission information so that only permitted functions are placed in a useable state for that user. Then, the processing proceeds to step S107. In substitution for user attribute information, the IC card may prerecord use permission information as illustrated in the management table 300. In this case, the MFP 100 imposes a use restriction according to the use permission information recorded on the IC card.

The management table 300 associates attribute information for each user using card authentication with a useable job (function) 301 in the MFP 100. According to the management table 300, for example, a user A (302) who has attribute information of "managerial staff" can use all functions. In contrast, a user B (303) who has attribute information of "general office employee" can use functions other than color copying. The management table 300 presets use permission information for each function for a user 304 that uses the coin vendor 140. That process is used in fee collection mode as described below.

Although the management table 300 illustrates an example of setting attribute information according to the job category (managerial staff, general office employee) of a user, attribute information an individual user may be set. For example, management of the functions that can be used by respective departments is enabled by setting attribute information for each office department. In this manner, setting of attribute information and use permission information corresponding to the attribute information can be freely set in advance by a decision made by a manager of the MFP 100.

Switching to Fee Collection Mode

On the other hand, in step S105, the CPU 110 switches the MFP 110 to a useable state in which a user can use the MFP 100 in fee collection mode according to a fee collected using a coin vendor 140. Then in step S106, the CPU 110 restricts the useable functions according to the use permission information in the fee collection mode that is preset in the management table 300. In this manner, only functions that are permitted to a user of the coin vendor 140 are placed in a useable state. Thereafter the processing proceeds to step S107.

In accordance with the management table 300, the CPU 110 permits a user to use only the monochrome copy and color copy functions when the user uses the coin vendor 140 conditional upon a payment condition of a predetermined fee, and restricts use of other functions. When the coin vendor 140 is used by a non-specified user, this processing imposes a restriction on use differently from card authentication. In this manner, a risk of leaking information from the MFP 100 can be reduced by imposing a restriction on a transmission or FAX function for transmitting document data through a network, or on a BOX function that stores document data in the HDD 116 or the like of the MFP 100.

Then in step S107, the CPU 110 prohibits use of the MFP 100 by another user, in a useable state either in authentication mode or fee collection mode, until that use is completed. For example, the CPU 110 prohibits log-in by another user using an IC card by invalidating the authentication apparatus 130. Furthermore collection of a fee using the coin vendor 140 is prohibited. More specifically, when a fee is inserted by another user into the coin vendor 140, that fee may be discharged to the coin return without processing. Furthermore the fee insertion port of the coin vendor 140 may be locked. The processing in step S107 prevents a state in which a plurality of users can use the apparatus, and imposes a suitable restriction on use of respective functions to individual users. Thereafter the processing proceeds to step S108.

Figure 4:
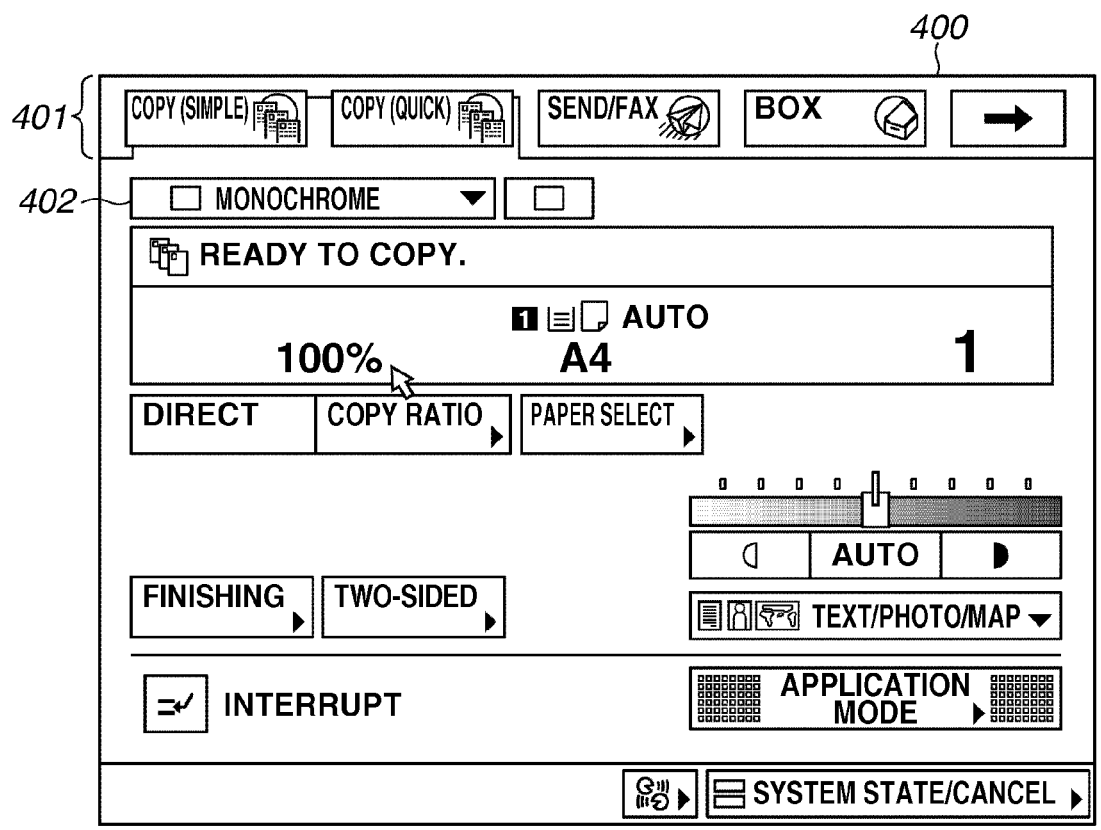
FIG. 4 illustrates an example of an operation screen displayed on an LCD display unit of an operation unit in the MFP according to the first exemplary embodiment of the present invention.

In step S108, the CPU 110 receives the input of set information for the job via the operation unit 104 or the like, and starts the execution of the set job. When the job is input into the MFP 100, for example, an operation screen 400 as illustrated in FIG. 4 is displayed on the LCD display unit of the operation unit 104. A user inputs the setting for the job, using the operation screen 400 by operating a touch panel disposed on the LCD display unit.

The operation screen 400 is displayed according to the settings in the management table 300. For example, when the user B (303) uses authentication mode, since color copying is restricted, only the monochrome copy (black and white) can be selected by a button 402. Furthermore when in fee collection mode, "send/FAX" or "BOX" that correspond to the restricted functions are not displayed by a tab 401. Furthermore the processing in step S107 prevents a use state of the MFP 100 in which a plurality of users can simultaneously use the apparatus. Consequently, a plurality of users who have a variety of use permission cannot share use of the operation screen 400. Therefore, suitable display on the operation screen 400 in the MFP 100 according to the present exemplary embodiment is performed according to the use permission information for the user.

When executing a print job that prints image data transmitted through the LAN 150 from the PC 151 or the like, setting information for the job is input to the MFP 100 together with the image data. Therefore in authentication mode, in substitution for card authentication, the MFP 100 may receive authentication information input through the operation screen displayed on the PC 151 or the like, and may acquire attribute information based on this authentication information.

After executing the job in step S108, in step S109, the CPU 110 determines whether the use of the MFP 100 is finished. When CPU 100 detects that a key instructing switching to a log-off mode, such as a cancel key on the operation unit 104, has been pressed by a user, the CPU 100 determines that use has finished and switches to a log-off state. When the cancel key or the like on the operation unit 104 is pressed during execution of a job, execution of the job may be cancelled and the MPF 100 may switch to log-off mode. On the other hand, in step S109, when a new job is input, the CPU 110 returns to step S108 by determining that use has not finished, and executes the subsequent job.

During fee collection mode, it is determined that use has finished when there are no residual funds in the coin vendor 140. Although the fee inserted into the coin vendor 140 is collected for use of respective functions according to the settings in the management table 300, a user may supplement the fee to the coin vendor 140 during execution of the job.

As described above, an image forming apparatus according to the present exemplary embodiment uses both an authentication apparatus that authenticates a user and a fee collection apparatus that charges a user and collects a fee from the user to control user access. More specifically, when the image forming apparatus acquires attribute information for a user by authentication using the authentication apparatus, the information is used to restrict the useable functions. On the other hand, when a fee is collected by the fee collection apparatus, preset functions are restricted. In either of the above cases, in a useable state for that user, until that user finishes the use, use by another user is prohibited. In this manner, a useable state which enables use by a plurality of users is prohibited and it is possible to suitably restrict use of respective functions to respective users.

Figure 7:
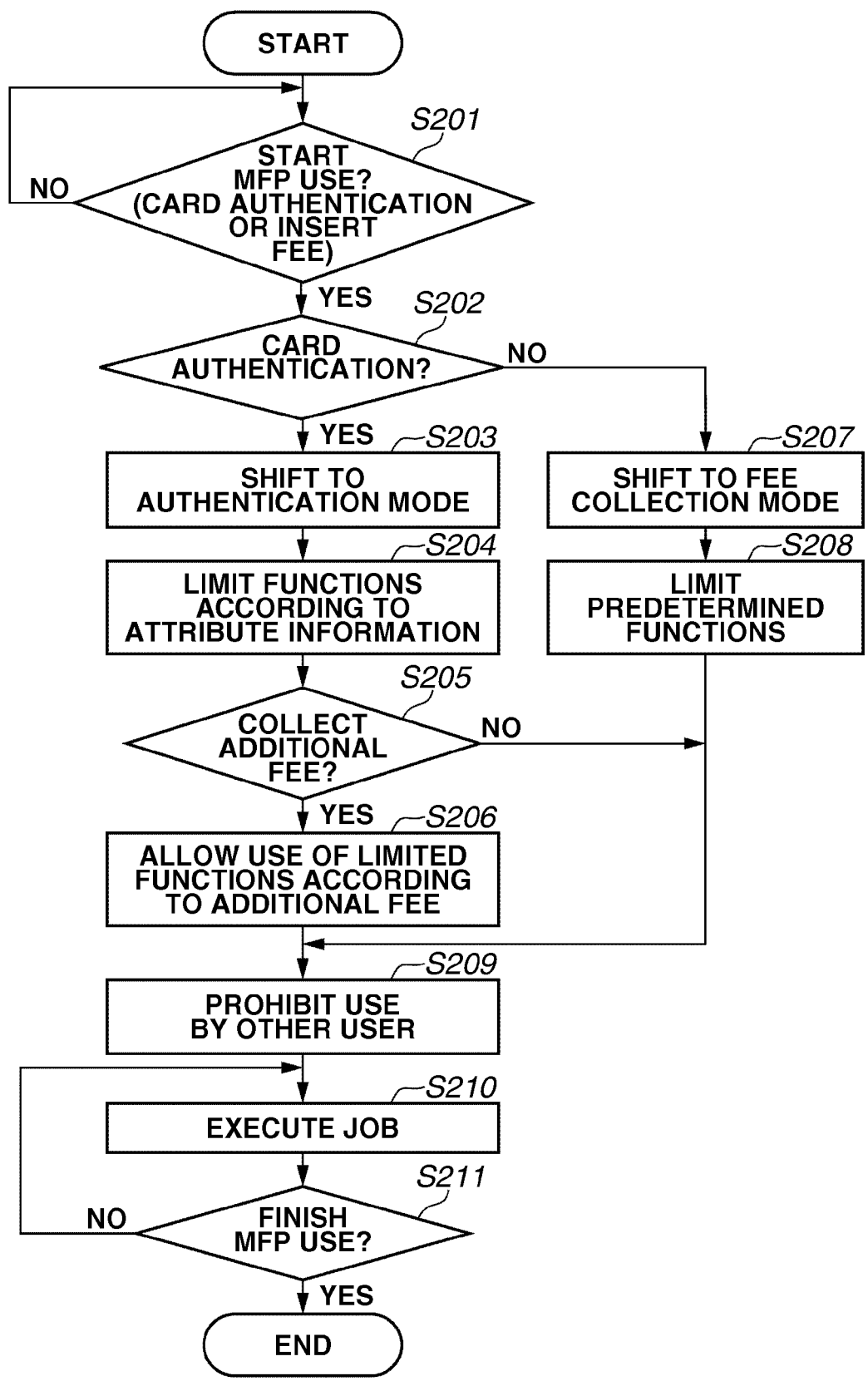
FIG. 7 is a flowchart illustrating a procedure for access control in the MFP according to the second exemplary embodiment of the present invention.

Next a second exemplary embodiment of the present invention will be described using FIG. 6 and FIG. 7. In the description below, only the aspects of the configuration and techniques that differ from the first exemplary embodiment will be described. The MFP 100 according to the first exemplary embodiment is characterized by restricting the useable functions in authentication mode according to acquired attribute information for a user and prohibiting use by another user. In contrast, when an additional fee is inserted into the coin vendor 140 by the current user and not another user, it may be desirable that use of restricted functions is permitted to the user according to the additional fee. In addition to the configuration of the first exemplary embodiment, the present exemplary embodiment is characterized in that a current user is permitted to use a restricted function.

Access control using the authentication apparatus 130 and the coin vendor 140 in the MFP 100 according to the present exemplary embodiment will be described below using FIG. 7. Firstly step S201 and step S202 are the same as step S101 and step S102 illustrated in FIG. 5. After proceeding to step S203 from step S202, the CPU 110 switches a process to authentication mode in the same manner as step S103 and step S104.

In step S204, the CPU 110 refers to the management table 600 illustrated in FIG. 6 and reads out use permission information for each function associated with the attribute information, which is acquired in the user authentication process. Then the MFP 100 is placed in a useable state in which the user can only use permitted functions, by imposing a restriction on the functions according to the use permission information. Thereafter the processing proceeds to step S205.

In step S205, the CPU 110 determines whether an additional fee has been collected by the coin vendor 140. When an additional fee has been inserted by a user into the coin vendor 140, the CPU 110 determines that the additional fee has been collected and proceeds to step S206. In step S206, the CPU 110 refers to the functions on which a use restriction was imposed in step S204 on the basis of the attribute information for the user and refers to the management table 600 to permit the user to use the apparatus according to the collected additional fee. Thereafter the processing proceeds to step S209. On the other hand, in step S205, when an additional fee is not inserted into the coin vendor 140, the CPU 110 determines that collection of an additional fee has not been executed and proceeds the processing to step S209.

According to the management table 600, although the user B (602) may use functions other than color copying in the same manner as the settings for the user B (302) in the management table 300, permission to use color copying functions is not given. However when user B wishes to use the color copying function, in step S205 and step S206, use of that function is permitted upon payment of an additional fee that is preset in the management table 600. As can be seen when the use permission information for the user B (602) and the user C (603) in the management table 600 is compared, a different additional fee may be set to each user according to the function. Furthermore the use permission information for a coin-vendor user can be set in the management table 600 in the same manner as the management table 300 according to the first exemplary embodiment.

The switching processing to fee collection mode in step S207 and step S208 is realized by the same processing as step S105 and step S106. The processing in steps S209 to S211 is realized by processing that is the same as that in steps S107 to S109. In step S210 and step S211, when there is a change in the residual funds in the coin vendor 140 in the course of job execution or due to insertion of an additional fee from the coin vendor 140, the CPU 110 refers again to the management table 600. In this manner, the CPU 110 can determine whether the residual funds satisfy the conditions set in the management table 600 in relation to functions permitted in step S206, and can enable use of the function when the relevant condition is satisfied.

As described above, when the image forming apparatus according to the present exemplary embodiment is switched to a useable state in which authentication of a user is executed by the authentication apparatus, a function on which a restriction is imposed on the basis of user attribute information can be used conditional upon the collection of an predetermined additional fee. In this manner, in addition to the effect of the first exemplary embodiment, a more flexible response to user permission in relation to respective functions is possible by collection of an additional fee and therefore convenience from a management point of view can be improved in relation to user restrictions on respective functions.

A third exemplary embodiment of the present invention will be described using FIG. 5, and FIG. 8 to FIG. 11. In the description below, only the aspects of the configuration and techniques that differ from the first and the second exemplary embodiments will be described. As a modification of the second exemplary embodiment, the present exemplary embodiment is characterized in that when a copy job or a print job including image forming (printing) is performed in authentication mode, a restriction is imposed on an upper limit of the number of sheets that can be printed according to the user attribute information.

Figure 5:
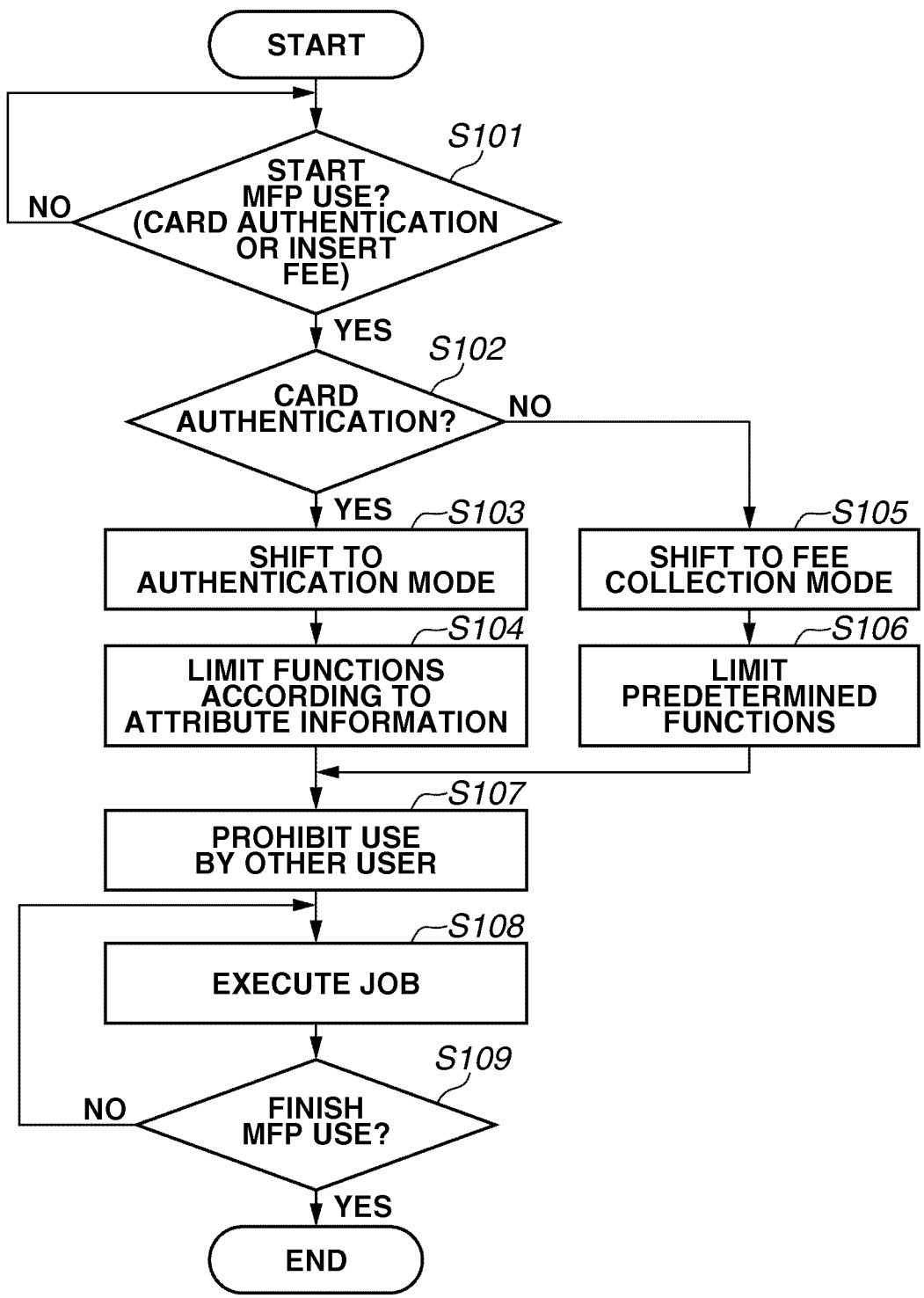
FIG. 5 is a flowchart illustrating a procedure for access control in the MFP according to the first exemplary embodiment of the present invention.

The CPU 110 of the MFP 100 according to the present exemplary embodiment realizes access control using the authentication apparatus 130 and the coin vendor 140 according to the procedure illustrated in FIG. 5. Since the switching process to fee collection mode is the same as that described in the first exemplary embodiment, only the switching process to authentication mode will be described.

In step S101 to step S103, the CPU 110 switches to authentication mode when card authentication is executed using the authentication apparatus 130. In step S110, the CPU 110 restricts the useable functions according to the user attribute information acquired by the card authentication. At that time, when use is permitted of functions such as a copying job or a print job including print processing, the CPU 110 uses the attribute information to impose a further restriction on the permitted the upper limit of the sheets that can be print processed in that function. Information related to the upper limit of the sheets is associated with user attribute information and is pre-stored in the ROM 121. Alternatively, this information may be prerecorded in an IC card.

Then after the processing in step S107, the processing proceeds to step S108. The details of the processing in step S108 will be described below based on the flowcharts illustrated in FIG. 10 and FIG. 11. In the present exemplary embodiment, when the printed-sheet number that is preset for the job exceeds the upper limit of sheet, the MFP 100 charges an additional fee required for the excess number of sheets to the user and collects the fee using the coin vendor 140. Fee collection may be performed either after the job is started when the printed-sheet number reaches the upper limit of sheet, or it may be collected prior to starting the job. Consequently, these two situations will be described separately below.

Collection of Additional Fee During Job Execution

Firstly collection of the additional fee during job execution will be described making reference to FIG. 10. In step S301, the CPU 110 receives an input of setting information for a job by displaying the operation screen 400 on the LCD display unit of the operation unit 104. Then in step S302, the CPU 110 starts execution of the input job according to the start instructions from a user. When job execution has started, in step S303, the CPU 110 determines whether the counter for calculation of the number of printed sheets has reached the upper limit of sheet. When it is determined that the upper limit of sheet has not been reached, the processing proceeds to step S306. However when it is determined that the upper limit of sheet has been reached, the processing proceeds to step S304. The counter is associated with user attribute information, for example, and is managed by the ROM 121.

Figure 8:
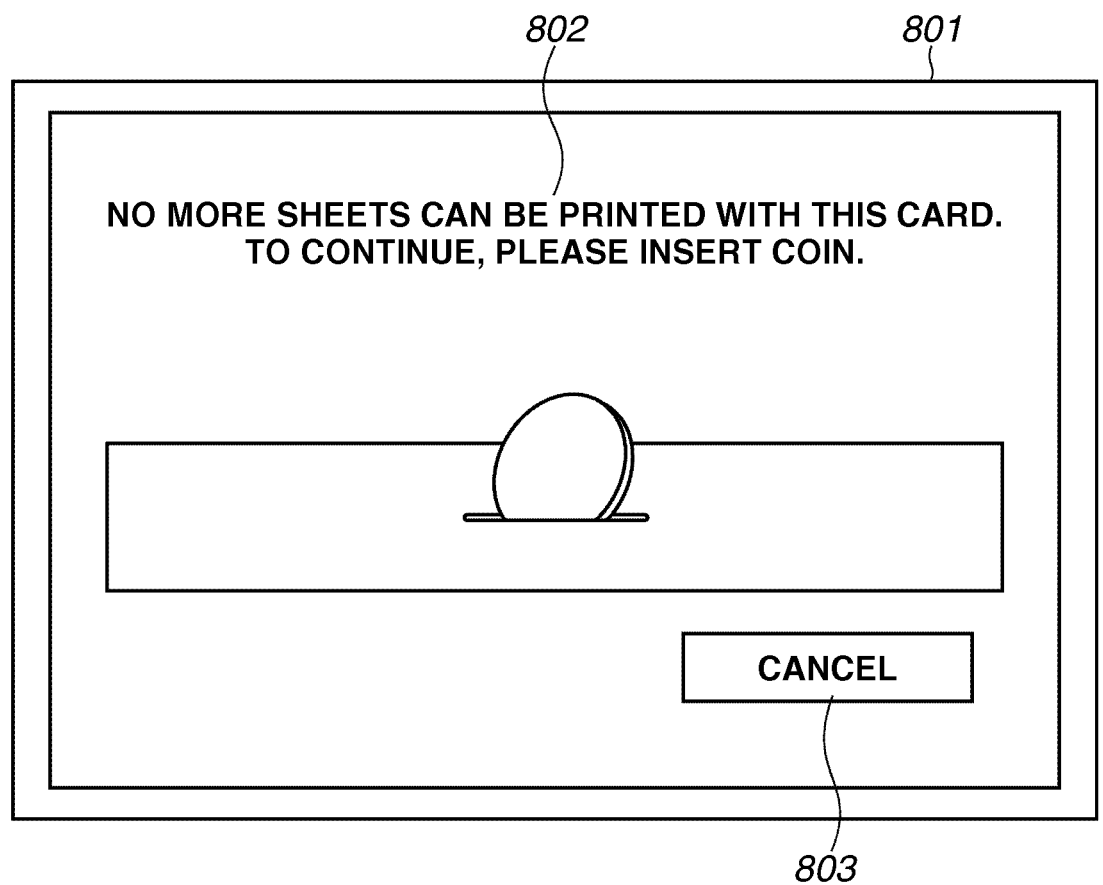
FIG. 8 illustrates an example of a screen displayed on an LCD display unit of an operation unit in the MFP according to a third exemplary embodiment of the present invention.

In step S304, the CPU 110 as illustrated in FIG. 8 executes display control to display a screen 801 including a message 802 prompting insertion of an additional fee into the coin vendor 140 on the LCD display unit of the operation unit 104. In this manner, the CPU 110 charges the user an additional fee required for continuing the performance of the job. Furthermore in step S305, the CPU 110 determines whether the fee inserted into the coin vendor 140 corresponds to a predetermined amount required for printing of at least one sheet. When it is determined that the inserted amount is sufficient, the processing proceeds to step S306, and when it is determined that the inserted amount is not sufficient, the processing returns to step S304, and display of the screen 801 is continued. When the cancel button 803 of the screen 801 is pressed by a user, execution of the job may be cancelled.

In step S306, the CPU 110 outputs a job execution result by printing and discharging one sheet. Furthermore in step S307, when the upper limit of sheet has not been reached, the CPU 110 summates the counter that calculates the sheet number. On the other hand, when the upper limit of sheet has already been reached, a fee is collected by deducting the required fee for one print from the residual amount of the additional fee. Thereafter, in step S308, the CPU 110 determines whether to finish job execution by confirming whether the print number that is set for the job has been completely executed. When it is determined that the job is finished, the series of processes illustrated in the flowchart is ended and the processing proceeds to step S109 in FIG. 5. On the other hand, when it is determined that the job has not finished, the processing returns to step S303, and execution of the job is continued.

Collection of Additional Fee Prior to Job Execution

Collection of the additional fee prior to job execution will be described below making reference to FIG. 11. In step S401, the CPU 110 in the same manner as step S301 receives input of setting information for a job from the operation screen 400 on the LCD display unit of the operation unit 104. In step S402, the CPU 110 determines whether the number of sheets that is required for execution of the job is available by calculating the difference between the counter calculating the printed sheet number and the upper limit of sheet. When it is determined that the required sheet number is available, the processing proceeds to step S407. On the other hand, when it is determined that the required sheet number is not available, the processing proceeds to step S403.

Figure 9:
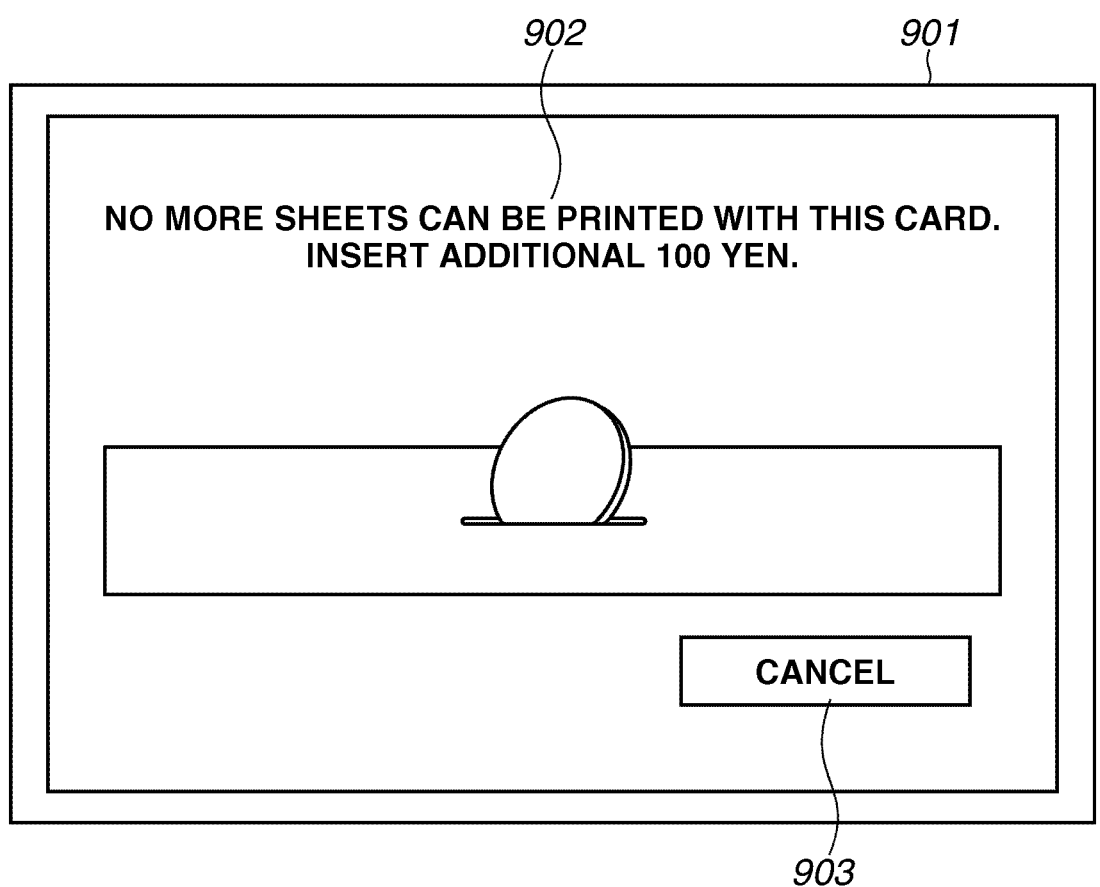
FIG. 9 illustrates an example of a screen displayed on an LCD display unit of an operation unit in the MFP according to the third exemplary embodiment of the present invention.

In step S403, the CPU 110 calculates the number of sheets exceeding the upper limit of sheet for execution of the job. In step S404, the additional fee required to print the excess number of sheets is calculated. Then the processing proceeds to step S405, and the CPU 110 as illustrated in FIG. 9 displays a screen 901 including a message 902 prompting insertion of the additional fee on the LCD display unit of the operation unit 104. In this manner, the CPU 110 charges the required additional fee to a user. Furthermore in step S406, the CPU 110 determines whether the fee inserted into the coin vendor 140 is sufficient for the required amount. When it is determined that the fee is sufficient for the required amount, the processing proceeds to step S407. When the fee is not sufficient for the required amount, the processing returns to step S405, and the display of the screen 901 is continued. When the cancel button 903 on the screen 901 is pressed by a user, the execution of the job may be cancelled.

In step S407, the CPU 110 starts execution of the set job and discharges sheets after print processing in sequence. After execution of the job, in step S408, when the job has been executed without collection of an additional fee, the CPU 110 summates the counter by the number of sheets printed in the job. When an additional fee is collected during execution of the job, the fee is collected by deducting the fee required for execution of the job from the residual amount of the additional fee. In this manner, the series of processes illustrated in the flowchart is ended and the processing proceeds to step S109 in FIG. 5. The processing in step S109 is the same as that described in the first exemplary embodiment.

As described above, when the image forming apparatus according to the present embodiment switches to a useable state in which user authentication is performed by the authentication apparatus, the image forming apparatus restricts the upper limit of the printable number of sheets according to user attribute information. When the printed number of sheets set for a job exceeds the upper limit of sheet, a fee is charged to a user for the excess number of sheets, and the job is executed conditional upon collection of the fee for the excess number of sheets. In this manner, in addition to the effect of the first exemplary embodiment, when the printed sheet number during execution of a single job exceeds the upper limit of sheet, cancellation of the job during execution of the job can be prevented. Furthermore as a result, job execution can be effectively carried out up to a set upper limit of sheet without re-inputting the cancelled job by a user.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-209813, filed Sep. 10, 2009 which is hereby incorporated by reference herein in its entirety.

What is claimed is:

1. An image forming apparatus comprising:
 a first communication unit configured to communicate with an authentication unit that authenticates a user;
 a second communication unit configured to communicate with a charging unit that charges a user a fee;
 a control unit configured to, in a case where the authentication unit authenticates a user, permit or restrict use of functions included in the image forming apparatus based on an authority of the user authenticated by the authentication unit, and in a case where the charging unit charges a user a fee without the authentication unit authenticating the user, permit use of a predetermined function among the functions included in the image forming apparatus; and
 a processing unit configured to process a job using a function permitted by the control unit, according to an instruction of the user authenticated by the authentication unit or an instruction of the user who has input the fee by the charging unit.

2. The image forming apparatus according to claim 1, wherein when the authentication unit authenticates the user and a fee is collected from the authenticated user, the control unit permits the user to use a restricted function.

3. The image forming apparatus according to claim 2, wherein the control unit imposes an upper limit of recording mediums that are permitted for execution of image formation.

4. The image forming apparatus according to claim 3, wherein the charging unit charges the user an additional fee required for continuing a job, during execution of the job that includes image formation when a number of sheets of the recording medium for execution of image formation reaches the upper limit.

5. The image forming apparatus according to claim 3, wherein the charging unit charges the user an additional fee prior to execution of the job that includes image formation when the number of sheets of the recording medium set for the job exceeds the upper limit.

6. The image forming apparatus according to claim 4, further comprising:
 a calculation unit configured to calculate the additional fee for the sheets exceeding the upper limit of sheet; and
 a display control unit configured to display a message on a display unit, which prompts a user that the calculated additional fee is to be collected.

7. A control method for an image forming apparatus communicates an authentication unit that authenticates a user and a charging unit that charges a user a fee, the method comprising:
 permitting or restricting use of functions included in the image forming apparatus based on an authority of a user authenticated by the authentication unit, in a case where the authentication unit authenticates the user;
 permitting use of a predetermined function among the functions included in the image forming apparatus, in a case where the charging unit charges a user a fee without the authentication unit authenticating the user; and
 processing a job using a permitted function, according to an instruction of the user authenticated by the authentication unit or an instruction of the user who has input the fee by the charging unit.

8. The method according to claim 7, further comprising permitting the user to use a restricted function when the authentication unit authenticates the user and a fee is collected from the user.

9. The method according to claim 8, further comprising:
 imposing a further restriction on the useable function, imposing an upper limit of recording mediums that are permitted for execution of image formation.

10. The method according to claim 9, further comprising:
 charging the user an additional fee required for continuing a job, during execution of the job that includes image formation when a number of sheets of the recording medium for execution of image formation reaches the upper limit.

11. The method according to claim 9, further comprising:
 charging the user an additional fee prior to execution of the job that includes image formation when the number of sheets of the recording medium set for the job exceeds the upper limit.

12. The method according to claim 10, further comprising:
 calculating the additional fee for the sheets exceeding the upper limit of sheet; and
 displaying a message on a display unit, which prompts a user that the calculated additional fee is to be collected.

13. A non-transitory computer-readable storage medium storing a computer program for causing a computer to execute the method for controlling an image forming apparatus according to claim 7.

14. The computer-readable storage medium according to claim 13, further comprising permitting the user to use a restricted function when the authentication unit authenticates the user and a fee is collected from the user.

15. The computer-readable storage medium according to claim 14, further comprising:
 imposing a further restriction on the useable function, imposing an upper limit of recording mediums that are permitted for execution of image formation.

16. The computer-readable storage medium according to claim 15, further comprising:
   charging the user an additional fee required for continuing a job, during execution of the job that includes image formation when a number of sheets of the recording medium for execution of image formation reaches the upper limit.

17. The computer-readable storage medium according to claim 15, further comprising:
   charging the user an additional fee prior to execution of the job that includes image formation when the number of sheets of the recording medium set for the job exceeds the upper limit.

18. The computer-readable storage medium according to claim 16, further comprising:
   calculating the additional fee for the sheets exceeding the upper limit of sheet; and
   displaying a message on a display unit, which prompts a user that the calculated additional fee is to be collected.

\* \* \* \* \*